(12) United States Patent
Marcotte et al.

(10) Patent No.: US 6,988,451 B2
(45) Date of Patent: Jan. 24, 2006

(54) RAIL CAR MOVER APPARATUS FOR LOADER VEHICLE

(75) Inventors: Neil Marcotte, Regina (CA); Barry Burt, Regina (CA)

(73) Assignee: Brandt Road Rail Corporation, (CA)

( * ) Notice: Subject to any disclaimer, the term of this patent is extended or adjusted under 35 U.S.C. 154(b) by 83 days.

(21) Appl. No.: 10/695,345

(22) Filed: Oct. 28, 2003

(65) Prior Publication Data
US 2004/0123768 A1    Jul. 1, 2004

Related U.S. Application Data

(60) Provisional application No. 60/421,694, filed on Oct. 28, 2002.

(51) Int. Cl.
*B61C 11/00* (2006.01)
(52) U.S. Cl. .............................. 105/215.1; 105/215.2; 105/72.2; 414/723
(58) Field of Classification Search ............... 105/26.1, 105/72.2, 215.1, 215.2, 90; 414/723, 699; 213/12, 15, 75 R
See application file for complete search history.

(56) References Cited

U.S. PATENT DOCUMENTS

| | | | |
|---|---|---|---|
| 3,884,156 A | 5/1975 | Ames et al. | |
| 4,266,483 A | 5/1981 | Rannanmaki | |
| 4,497,257 A | 2/1985 | White, Jr. | |
| 4,534,297 A * | 8/1985 | Johnson, Sr. | ............... 105/90.2 |
| 4,537,137 A * | 8/1985 | White, Jr. | ................... 105/72.2 |
| 4,843,973 A | 7/1989 | Hartelius et al. | |
| 4,850,790 A * | 7/1989 | Johnson et al. | .............. 414/723 |
| 5,873,417 A * | 2/1999 | Halischuk | ................... 172/246 |
| 6,199,485 B1 | 3/2001 | Pyle | |
| 6,763,767 B2 * | 7/2004 | Jackson et al. | ............. 105/72.2 |
| 2003/0089192 A1 * | 5/2003 | Shimizu et al. | ................ 74/552 |
| 2003/0172837 A1 * | 9/2003 | Whiston et al. | ......... 105/215.2 |
| 2004/0064978 A1 * | 4/2004 | Hendron | ....................... 37/410 |

* cited by examiner

*Primary Examiner*—Frantz F. Jules

(74) *Attorney, Agent, or Firm*—Frost Brown Todd LLC

(57) ABSTRACT

A rail car mover apparatus for a loader vehicle comprises means to rotatably attach a pair of front rail wheels to a front end of the loader vehicle such that the front rail wheels are spaced to engage the pair of railroad rails and such that the front rail wheels can move up and down in response to forces exerted by a front actuator; means to rotatably attach a pair of rear rail wheels to a rear end of the loader vehicle such that the rear rail wheels are spaced to engage the pair of railroad rails and such that the rear rail wheels can move up and down in response to forces exerted by a rear actuator; and a coupler adapter adapted at a rear end thereof for attachment to a front portion of the loader arms and adapted at a front end thereof for coupling to a rail car hitch.

17 Claims, 2 Drawing Sheets

RAIL CAR MOVER APPARATUS FOR LOADER VEHICLE

This aplication claims the benefit of Provisional App. No. 60/421,694, filed Oct. 28, 2002.

This invention is in the field of vehicles for road and railway use, and in particular such vehicles for moving rail cars.

BACKGROUND

Rail car movers are used to maneuver rail cars around yards, plants, and like industrial sites. Such rail car movers vary considerably in size, complexity, and cost depending on the number and weight of rail cars being moved, maneuverability required, and so forth.

Some rail car movers are manufactured specifically for the purpose, and are capable of moving several loaded cars, however they are costly and often provide significantly more motive performance than is required. Such rail car movers are disclosed in U.S. Pat. Nos. 4,497,257 and 4,537,137 to White, Jr., and U.S. Pat. No. 4,843,973 to Hartelius et al. Typically these have rail wheel sets and road wheel sets configured such that one set is entirely raised out of contact so that the other set can rest on either the road or rail and bear the load. These rail car movers include driven rail wheels and driven road wheels. Whichever wheels are in use are driven by the engine of the mover.

Such rail car movers can gain traction by transferring weight from the rail car to the mover, essentially by lifting up on the rail car coupler and thereby creating a downward force on the mover wheels on the track. Such a system is generally disclosed for example in U.S. Pat. No. 3,884,156 to Ames et al.

More economical alternatives are also known wherein conventional tractors or the like are converted into rail car movers. While motive performance is reduced, these can provide satisfactory performance in many situations, and cost much less. U.S. Pat. No. 4,266,483 to Rannanmaki discloses a modified tractor where the conventional pneumatic rear wheels and tires are replaced by a flanged wheel for engaging the track. A rear axle with pneumatic road wheels is added behind the flanged wheels, and moves up and down in response to hydraulic cylinders operated with the tractors hydraulic power supply. In the road mode, the pneumatic road wheels are driven by the power take off of the tractor. A front rail axle with rail wheels is also added ahead of the conventional front axle, and similarly moves up and down as required. A coupler is located at the rear end of the tractor for attachment of a rail car.

Similarly U.S. Pat. No. 6,199,485 to Pyle discloses a rail conversion module for a tractor. A rear module has rail wheels attached and pivots up and down. The rail wheels in this apparatus are driven by the power take off of the tractor. Front rail wheels are pivotally attached behind the front road wheels. A coupler is located at the rear end of the rear module for attachment of a rail car.

While the above use driven rail wheels for propulsion, it is also known to leave some weight on the vehicle's conventional pneumatic tires in rail mode, thereby allowing the vehicle to be propelled by the tires conventionally while being guided down the rails by the rail wheels. Such road/rail vehicles are generally disclosed in U.S. Pat. No. 3,980,025 to Olson, Sr. et al. and U.S. Pat. No. 5,156,639 to Bostrum. These vehicles are not used as rail car movers however, but rather as road/rail transport or maintenance vehicles.

It is not uncommon for rail car movers to sit idle for significant periods of time. At grain terminal sites for example, several days may pass between trains. The rail car mover is used moving cars as the train is loaded, and then is not required until the next train arrives. Other industrial sites have similar use cycles for rail car movers.

The rail car movers of Rannanmaki and Pyle do allow relatively economical conversion of a conventional vehicle, a tractor, into a rail car mover, however the modifications required are significant, and do not lend themselves to quick conversion to another purpose such as conventional use of the tractor on the ground. As a result, these rail car movers converted from tractors often spend more time idle than working.

SUMMARY OF THE INVENTION

It is an object of the present invention to provide a rail car mover adapter apparatus that overcomes problems in the prior art. It is a further object of the present invention to provide such an apparatus for a vehicle with a front end loader, such as a skid steer loader. It is a further object of the present invention to provide such an apparatus that is simple and economical, and that can conveniently be removed, in whole or in part, to allow the loader vehicle to perform conventional loader operations.

The present invention provides in one embodiment a rail car mover apparatus for a loader vehicle, the loader vehicle comprising ground tires spaced to roll along a pair of railroad rails, a drive to rotate the ground tires, loader arms extending forward of the loader vehicle, and a tool attachment mechanism at a lower front portion of the loader arms adapted for attachment to a tool such that the tool can be raised and lowered by the loader arms. The apparatus comprises a front wheel bracket adapted for attachment to a front end of the loader vehicle; a pair of front wheel arms pivotally attached to the front wheel bracket about a substantially horizontal front pivot axis and extending forward from the front wheel bracket, and a pair of front rail wheels spaced to engage the pair of railroad rails wherein a front rail wheel is rotatably attached to a front end of each front wheel arm; a front actuator operative to move the front wheel arms up and down about the front pivot axis; a rear wheel bracket adapted for attachment to a rear end of the loader vehicle; a pair of rear wheel arms pivotally attached to the rear wheel bracket about a substantially horizontal rear pivot axis and extending rearward from the rear wheel bracket, and a pair of rear rail wheels spaced to engage the pair of railroad rails wherein a rear rail wheel is rotatably attached to a rear end of each rear wheel arm; a rear actuator operative to move the rear wheel arms up and down about the rear pivot axis; and a coupler adapter adapted at a rear end thereof for attachment to the tool attachment mechanism and adapted at a front end thereof for coupling to a rail car hitch.

In a second embodiment the present invention provides rail car mover loader vehicle comprising ground tires spaced to roll along a pair of railroad rails, a drive to rotate the ground tires, and loader arms extending forward of the loader vehicle and operative to move up and down. A pair of front rail wheels is spaced to engage the pair of railroad rails and rotatably attached to a front end of the loader vehicle such that the front rail wheels can move up and down in response to forces exerted by a front actuator. A pair of rear rail wheels is spaced to engage the pair of railroad rails and rotatably attached to a rear end of the loader vehicle such that the rear rail wheels can move up and down in response to forces exerted by a rear actuator. A coupler adapter is attached at a rear end thereof to a front portion of the loader arms and is adapted at a front end thereof for coupling to a rail car hitch.

In a third embodiment the present invention provides a rail car mover apparatus for a loader vehicle, the loader vehicle comprising ground tires spaced to roll along a pair of railroad rails, a drive to rotate the ground tires, and loader arms extending forward of the loader vehicle and operative to move up and down. The apparatus comprises means to rotatably attach a pair of front rail wheels to a front end of the loader vehicle such that the front rail wheels are spaced to engage the pair of railroad rails and such that the front rail wheels can move up and down in response to forces exerted by a front actuator; means to rotatably attach a pair of rear rail wheels to a rear end of the loader vehicle such that the rear rail wheels are spaced to engage the pair of railroad rails and such that the rear rail wheels can move up and down in response to forces exerted by a rear actuator; and a coupler adapter adapted at a rear end thereof for attachment to a front portion of the loader arms and adapted at a front end thereof for coupling to a rail car hitch.

The invention thus provides rail wheels that move up and down at the front and rear of the loader vehicle, and a rail car coupler attached to the loader arms. The weight of the loader vehicle can thus rest on the rail wheels and ground wheels, the proportion resting on each depending on the force exerted down on the rail wheels by the actuators.

The actuators to move the rail wheels up and down are typically fluid cylinders, typically air or hydraulic cylinders. Propulsion is provided by the conventional loader tires which bear more or less of the vehicle's weight, depending on the pressure in the fluid cylinders. Where more traction is required, the pressure can be reduced thereby placing more weight on the tires and less on the rail wheels. Once the vehicle is moving, the traction requirement is generally reduced and the pressure can be increased to reduce weight on the tires at higher speeds, and thereby reduce wear on the rubber tires.

Conveniently the coupling adapter is attachable to the loader arms on the vehicle using the same quick-attach mechanism that is conventionally used to attach the loader bucket or like tools to the loader arms. It is well known to quick-attach jack-hammers, post-hole augers, grapples, compactors and various like tools to such loaders. The coupling adapter can conveniently be mounted in the same manner. The coupling hitch on the adapter has a closed bottom such that the loader arms can be raised to transfer weight from a coupled rail car to the loader vehicle, and thereby increase traction when required.

Conveniently, the apparatus can be configured so that the front rail wheels and the coupler adapter can be readily removed to allow normal loader vehicle operations. In many cases, the rear rail wheels could be left on without significant interference with loader operation, thereby further reducing time required to convert from rail to conventional mode. Alternatively, the rear rail wheels can also be readily removed. In addition to the rear rail wheels and fluid cylinders, often an air compressor and pressure tank to supply the fluid cylinders will be mounted to the rear bracket attached to the rear end of the loader vehicle. Removing the fasteners holding the rear bracket to the vehicle would remove the rear portion of the adapter apparatus.

Loader vehicles suitable for the conversion of the present invention are commonly found at industrial sites where rail car movers are also used. The rail car mover of the invention provides an economical adapter apparatus for converting such loader vehicles into rail car movers when required, and then converting back to normal loader operations when the rail car mover is not required.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
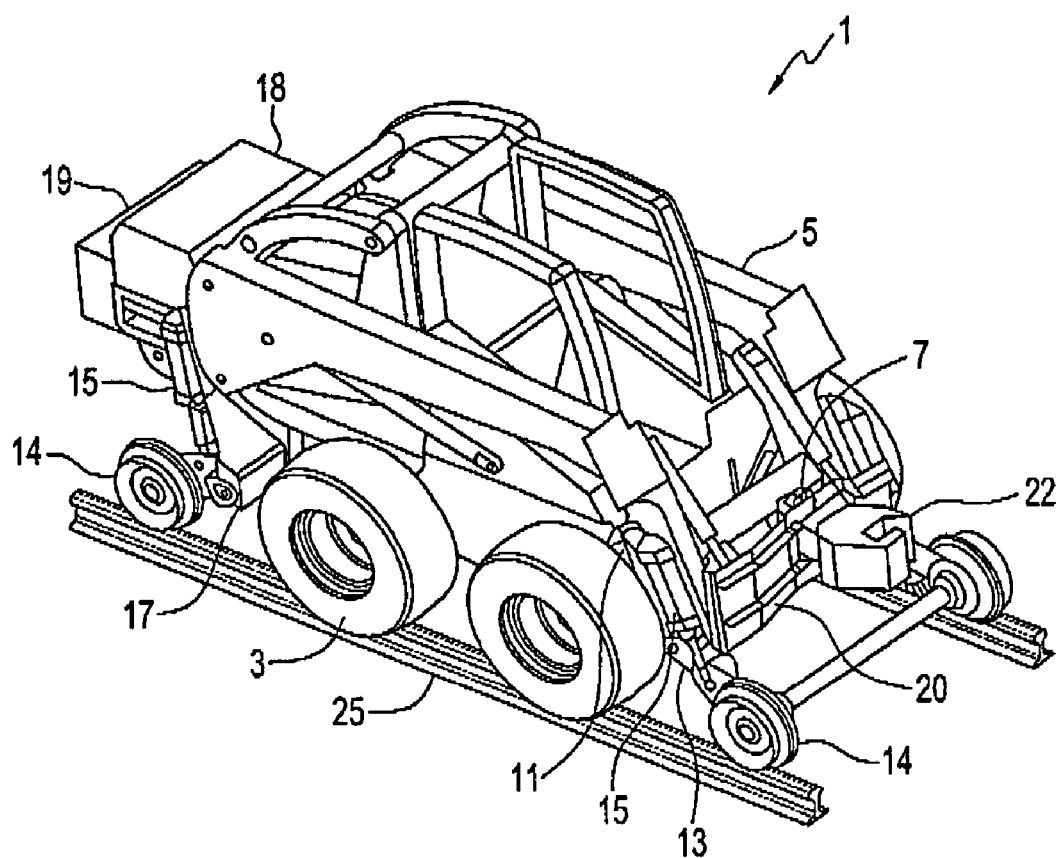
FIG. 1 is a perspective front view of an embodiment of the adapter of the invention mounted on a skid steer loader and illustrated in the rail operating mode.
Figure 2:
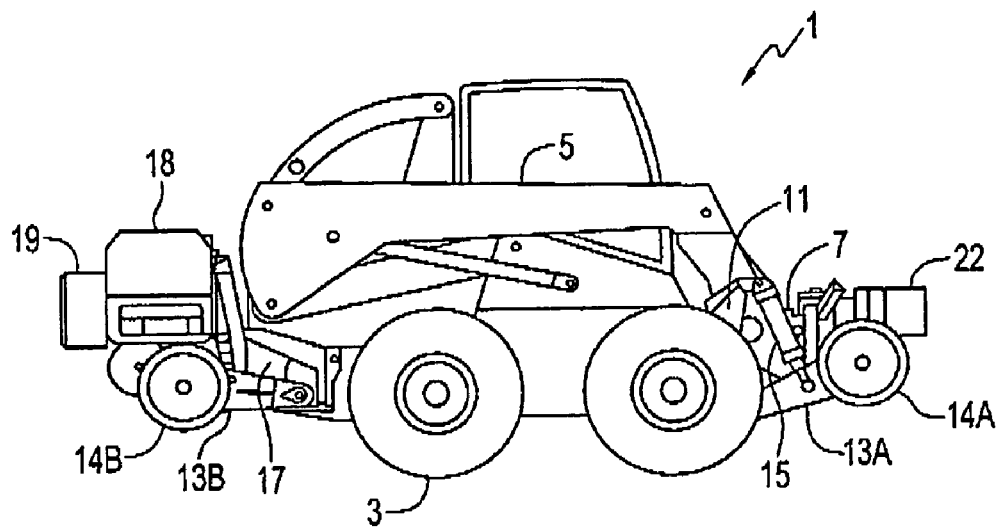
FIG. 2 is side view of the embodiment in the conventional ground operating mode, with the rail wheels raised.
Figure 3:
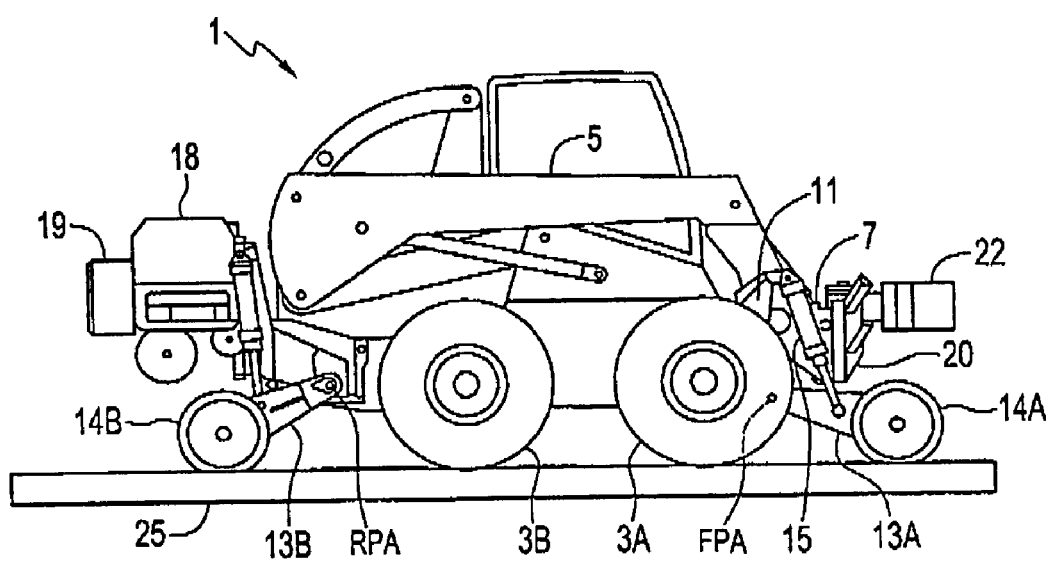
FIG. 3 is side view of the embodiment in the rail operating mode with the rail wheels lowered.

FIGS. 1–3 illustrate a skid steer loader vehicle 1 with a rail car mover adapter apparatus of the invention attached. The loader vehicle 1 conventionally includes wheels bearing ground tires 3, loader arms 5, and a tool attachment mechanism, such as the conventional quick-attach mechanism 7 located at the front of the loader arms 5 for attachment of a loader bucket, jack-hammer, post-hole auger, grapple, compactor, or other such tool. A skid steer vehicle steers by varying the speed of the wheels on one side compared to the other side, and thus has the advantage of maintaining the front and rear wheels in alignment on a rigid frame during use, and thus aligned with the rails. Other vehicle types could be used as well, as dictated by circumstances.

The adapter apparatus provides front and rear rail wheels 14 that move up and down to engage a pair of railroad rails 25. The illustrated adapter apparatus comprises a front wheel bracket 11 attached to the front of the loader vehicle 1. The attachment can be by several bolts or other fasteners which may be removed in a fairly short time. A quick-attach latch mechanism could be provided so that same could be removed more quickly. Some permanent mounts may need to be welded to the loader vehicle 1 to facilitate removably mounting the front wheel bracket 11, however these can be located so that they do not interfere with conventional operation of the loader vehicle 1 when the bracket is removed. Alternatively the front wheel bracket 11 could be permanently mounted, and the wheel arms 13, attached wheels 14, and cylinders 15 could be removably attached to the front wheel bracket 11.

Front wheel arms 13A have a front rail wheel 14A rotatably attached at one end, and are pivotally attached to the front wheel bracket 11 at the opposite end about a substantially horizontal front pivot axis FPA. Front wheel arms 13A extend forward such that the front rail wheels 14A are forward of the front ground wheels 3A. Double acting extendable fluid cylinders 15 are attached between the top of the front wheel bracket 11 and the arms 13A and move the arms 13A and attached wheels 14A up and down.

Similarly, a rear wheel bracket 17 is attached to the rear of the loader vehicle 1 by several fasteners or a quick-attach latch mechanism. Again rear wheel arms 13B have a rear rail wheel 14B rotatably attached at one end, and are pivotally attached to the rear wheel bracket 17 at the opposite end about a substantially horizontal rear pivot axis RPA. Fluid cylinders 15 are attached between the top of the rear wheel bracket 17 and the arms 13B and move the arms 13B and attached wheels 14B up and down. Rear wheel arms 13B extend rearward such that the rear rail wheels 14B are rearward of the rear ground wheels 3B.

Other mechanisms could be provided to raise and lower the rail wheels 14 with respect to the vehicle 1, such as a sliding mechanism as opposed to the illustrated pivoting arms. It is contemplated that the front and rear rail wheels 14A, 14B will most conveniently be oriented rearward and forward of respective front and rear ground tires 3A, 3B as illustrated.

Also attached to the rear bracket 17 is a pressure tank 18 and an air compressor 19 that is driven by the engine of the loader vehicle 1, typically by a hydraulic motor, although a mechanical driveline could be provided on suitable vehicles. Also where a suitable source of pressurized fluid is available on the loader vehicle, the compressor 19 and tank 18 would not be required.

A coupler adapter 20 is attached to the quick-attach mechanism 7 on the loader arms 5. Such quick-attach mechanisms 7 are conventionally operative to mate to and releasably engage a properly configured tool to the loader arms 5 such that the tool can be moved up and down, and typically as well can be tilted using tilt cylinders that are included on the loader vehicle. The coupler adapter 20 is configured at a rear end thereof to attach to the quick-attach mechanism 7 in a manner substantially the same as such a tool.

The coupler adapter 20 is further adapted at a front end thereof for coupling to a rail car hitch by a rail car coupler hitch 22. The coupler adapter 20 can be raised and tilted using the conventional controls of the loader vehicle 1. The rail car coupler hitch 22 extends forward from the coupler adapter 20 and includes a closed bottom so that an upward force may be exerted on the coupler of an attached rail car by raising the coupler adapter 20, thereby transferring weight to the loader vehicle 1.

When in the rail mode illustrated in FIGS. 1 and 3, propulsion is provided by the ground tires 3 which bear against the rails 25. The rail wheels bear sufficiently against the rails 25 to maintain the loader vehicle 1 on the rails 25, and prevent it from sliding off. The width between the ground wheels 3 is such that a sufficient portion of the ground wheel 3 on each side bears against the corresponding rail 25 to provide propulsion. Commonly skid steer loaders of the type illustrated have such a spacing between the wheels, however spacers or modified hubs could be provided if necessary without significantly detracting from the conventional operational capabilities of the loader.

The fluid cylinders 15 illustrated are air cylinders that extend or retract in response to the pressure of air fed into same from the air compressor 19. The pressure in the fluid cylinders 15 controls the proportion of the weight of the loader vehicle 1 that is born by the rail wheels 14 or the ground tires 3, including any weight transferred from the rail car to the loader vehicle 1 through the coupling coupler adapter 20.

Where more traction is required, such as when starting a load from a resting position, the pressure can be reduced thereby placing more weight on the tires 3 to increase traction, and less on the rail wheels 14. Once the vehicle 1 is moving, the traction requirement is generally reduced and the pressure in the fluid cylinders 15 can be increased to push the rail wheels down more and thereby reduce the weight on the tires 3. Reducing the weight on the tires 3 at higher speeds will reduce wear on the tires 3. The pressure is controlled by the operator with a conventional pressure regulating valve.

FIG. 2 illustrates the loader vehicle 1 and attached adapter apparatus in the ground operating mode with the rail wheels 14 raised up off the ground. In this mode the loader vehicle 1 can be moved across the ground from one track to the next as required. It can also readily be perceived from FIG. 2 that removing the front wheel bracket 11, or at least the arms 13, rail wheels 14, and fluid cylinders 15 attached thereto, will clear the front end of the loader vehicle 1. With these parts removed, the coupler adapter 20 can be lowered to the ground and detached from the quick-attach mechanism 7, allowing for the attachment of a conventional bucket or other tool. In many situations with the rail wheels 14 raised off the ground, the rear bracket 17, attached tank 18 and compressor 19, can be left in place without interfering significantly with loader operations. If desired, the rear bracket 17 can also be completely removed to convert the loader vehicle 1 back to a conventional configuration.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rail car mover apparatus for a loader vehicle, the loader vehicle comprising ground tires spaced to roll along a pair of railroad rails, a drive to rotate the ground tires, loader arms extending forward of the loader vehicle, and a tool attachment mechanism at a lower front portion of the loader arms adapted for attachment to a tool such that the tool can be raised and lowered by the loader arms, the apparatus comprising:

a front wheel bracket adapted for attachment to a front end of the loader vehicle;

a pair of front wheel arms pivotally attached to the front wheel bracket about a substantially horizontal front pivot axis and extending forward from the front wheel bracket, and a pair of front rail wheels spaced to engage the pair of railroad rails wherein a front rail wheel is rotatably attached to a front end of each front wheel arm;

a front actuator operative to move the front wheel arms up and down about the front pivot axis;

a rear wheel bracket adapted for attachment to a rear end of the loader vehicle;

a pair of rear wheel arms pivotally attached to the rear wheel bracket about a substantially horizontal rear pivot axis and extending rearward from the rear wheel bracket, and a pair of rear rail wheels spaced to engage the pair of railroad rails wherein a rear rail wheel is rotatably attached to a rear end of each rear wheel arm; and a rear actuator operative to move the rear wheel arms up and down about the rear pivot axis;

a coupler adapter adapted at a rear end thereof for attachment to the tool attachment mechanism and adapted at a front end thereof for coupling to a rail car hitch;

where in operation the ground tires bear against the railroad rails to propel the loader vehicle along the railroad rails, and the front and rear rail wheels rotate freely in response to movement of the loader vehicle along the railroad rails; and wherein the loader vehicle can be converted to ground operation for maneuvering and manipulating a tool by removing the front wheel arms, front rail wheels, and coupler adapter and attaching the tool to the tool attachment mechanism.

2. The apparatus of claim 1 wherein at least one actuator comprises an extendable cylinder.

3. The apparatus of claim 2 wherein the extendable cylinder is operated by a pressurized fluid.

4. The apparatus of claim 3 wherein the front actuator comprises a pair of front extendable cylinders operated by a pressurized fluid, and wherein each front extendable cylinder moves one of the front wheel arms.

5. The apparatus of claim 4 wherein the rear actuator comprises a pair of rear extendable cylinders operated by a pressurized fluid, and wherein each rear extendable cylinder moves one of the rear wheel arms.

6. The apparatus of claim 4 further comprising a pressurized fluid source adapted to be attached to the loader vehicle and powered by the loader vehicle.

7. The apparatus of claim 3 wherein a pressure of the pressurized fluid can be adjusted.

8. The apparatus of claim 1 wherein the front wheel arms are adapted for removable attachment to the front wheel bracket.

9. The apparatus of claim 1 wherein the front wheel bracket is adapted for removable attachment to the front end of the loader vehicle.

10. The apparatus of claim 1 wherein the loader vehicle is a skid steer loader vehicle.

11. The apparatus of claim 1 wherein the tool attachment mechanism is a quick-attach mechanism operative to releasably attach a tool to the loader arms, and wherein the coupler adapter is configured at a rear end thereof to attach to the quick-attach mechanism in a manner substantially the same as the tool.

12. A rail car mover apparatus for a loader vehicle, the loader vehicle comprising ground tires spaced to roll along a pair of railroad rails, a drive to rotate the ground tires, and loader arms extending forward of the loader vehicle and operative to move up and down, and a tool attachment mechanism on a front end of the loader arms, the apparatus comprising:

a pair of front rail wheels;
means to rotatably attach the pair of front rail wheels to a front end of the loader vehicle such that the front rail wheels are spaced to engage the pair of railroad rails and such that the front rail wheels can move up and down in response to forces exerted by a front actuator;
a pair of rear rail wheels;
means to rotatably attach the pair of rear rail wheels to a rear end of the loader vehicle such that the rear rail wheels are spaced to engage the pair of railroad rails and such that the rear rail wheels can move up and down in response to forces exerted by a rear actuator;
a coupler adapter adapted at a rear end thereof for attachment to the tool attachment mechanism and adapted at a front end there of for coupling to a rail car hitch;
where in operation the ground tires bear against the railroad rails to propel the loader vehicle along the railroad rails, and the front and rear rail wheels rotate freely in response to movement of the loader vehicle along the railroad rails;

wherein the loader vehicle can be converted to conventional operation by removing the front wheel arms and coupler adapter.

13. The apparatus of claim 12 further comprising a pressurized fluid source powered by the loader vehicle, and wherein the front actuator comprises an extendable cylinder operative to extend and retract in response to pressure exerted in the extendable cylinder by pressurized fluid from the pressurized fluid source and wherein the pressure in the front actuator can be varied such that proportions of vehicle weight carried by the front rail wheels relative to the front ground tires can be varied.

14. A skid steer loader vehicle apparatus adapted for conventional use and for use to move rail cars on a set of railroad rails, the apparatus comprising:

a loader vehicle having front and rear ground tires spaced to roll along a pair of railroad rails and a drive operative to rotate the ground tires;
loader arms extending forward of the loader vehicle and operative to move up and down, and a tool attachment mechanism on a front end of the loader arms;
a pair of front rail wheels spaced to engage the pair of railroad rails and removably attached to a front end of the loader vehicle such that the front rail wheels can rotate freely and can move up and down in response to forces exerted by a front actuator;
a pair of rear rail wheels spaced to engage the pair of railroad rails and attached to a rear end of the loader vehicle such that the rear rail wheels can rotate freely and can move up and down in response to forces exerted by a rear actuator;
a coupler adapter adapted at a rear end thereof for releasable attachment to the tool attachment mechanism and adapted at a front end thereof for coupling to a rail car hitch;
a tool adapted for releasable attachment to the tool attachment mechanism;
where in operation the ground tires bear against the railroad rails to propel the loader vehicle along the railroad rails, and the front and rear rail wheels rotate in response to movement of the loader vehicle along the railroad rails and
wherein the loader vehicle can be converted to conventional use by removing the front rail wheels and coupler adapter, installing the tool on the tool attachment mechanism.

15. The apparatus of claim 14 further comprising a pressurized fluid source powered by the loader vehicle, and wherein the front actuator comprises an extendable cylinder operative to extend and retract in response to pressure exerted in the extendable cylinder by pressurized fluid from the pressurized fluid source.

16. The apparatus of claim 15 wherein the rear actuator comprises an extendable cylinder operative to extend and retract in response to pressure exerted in the extendable cylinder by pressurized fluid from the pressurized fluid source.

17. The apparatus of claim 15 wherein the pressure in the front actuator can be varied such that proportions of vehicle weight carried by the front rail wheels relative to the front ground tires can be varied.

* * * * *